United States Patent
Bingham

(10) Patent No.: US 6,921,858 B2
(45) Date of Patent: Jul. 26, 2005

(54) METHOD AND APPARATUS FOR PRESSURIZING A LIQUEFIED GAS

(75) Inventor: Dennis N. Bingham, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 333 days.

(21) Appl. No.: 10/290,809

(22) Filed: Nov. 8, 2002

(65) Prior Publication Data

US 2004/0089335 A1 May 13, 2004

(51) Int. Cl.$^7$ .......................... H01L 35/50; H01L 35/28; H01L 35/34; F25B 21/02
(52) U.S. Cl. .......................... 136/203; 136/208; 62/3.2; 62/3.6; 261/128; 261/134; 261/140.1; 261/141; 141/11
(58) Field of Search .................. 136/203, 208; 62/3.2, 3.6; 261/128, 134, 140.1, 141; 141/11

(56) References Cited

U.S. PATENT DOCUMENTS

| | | | |
|---|---|---|---|
| 3,801,284 A | | 4/1974 | Meckler |
| 3,879,229 A | | 4/1975 | Gilbert |
| 4,593,529 A | | 6/1986 | Birochik |
| 4,897,226 A | * | 1/1990 | Hoyle et al. ................ 261/129 |
| 5,174,121 A | * | 12/1992 | Miller .......................... 62/3.7 |
| 5,287,702 A | * | 2/1994 | Blackshaw et al. ........... 62/3.2 |
| 5,619,856 A | * | 4/1997 | Lee .............................. 62/3.64 |
| 6,003,317 A | | 12/1999 | Neubert |
| 6,096,966 A | | 8/2000 | Nishimoto et al. |
| 6,231,008 B1 | * | 5/2001 | Schwarting ............. 244/135 R |
| 6,363,728 B1 | | 4/2002 | Udischas et al. |
| 2002/0178724 A1 | * | 12/2002 | Hunt ............................ 60/649 |
| 2002/0179425 A1 | * | 12/2002 | Dableh .......................... 203/1 |
| 2004/0089336 A1 | * | 5/2004 | Hunt .......................... 136/205 |

FOREIGN PATENT DOCUMENTS

| | | | |
|---|---|---|---|
| JP | 2001-108310 A | * | 4/2001 |
| WO | WO 91/10477 A1 | * | 7/1991 |

* cited by examiner

*Primary Examiner*—Alan Diamond
(74) *Attorney, Agent, or Firm*—Trask Britt PC

(57) ABSTRACT

Apparatus providing at least one thermoelectric device for pressurizing a liquefied gas container and methods employing same are disclosed. A thermoelectric device including a heating surface and a cooling surface is used for pressurizing a container by vaporizing liquefied gas within the container by transferring heat energy from a portion of the liquefied gas in contact with the cooling surface to another portion of the liquefied gas in contact with the heating surface of the thermoelectric device to convert some of the liquefied gas to a vapor state. Liquefied gas vapor and/or liquid phase may be supplied by disclosed apparatus and methods. The apparatus may also be used as a vapor pump or a liquid pump, or fluid pump. Methods of operation are also disclosed.

54 Claims, 8 Drawing Sheets

METHOD AND APPARATUS FOR PRESSURIZING A LIQUEFIED GAS

GOVERNMENT RIGHTS

The United States Government has certain rights in the following invention pursuant to Contract No. DE-AC07-99ID13727 between the U.S. Department of Energy and Bechtel BWXT Idaho, LLC.

BACKGROUND OF THE INVENTION

1. Field of the Invention

The present invention relates generally to apparatus and methods for pressurizing a closed vessel in the form of a container used to store a liquid such as a liquefied gas so that pressure within the container may be increased, maintained or otherwise controlled. More specifically, the present invention relates to utilizing thermoelectric cooler/heater configurations to vaporize a portion of a liquid such as a liquefied gas by contact with a heating surface of the thermoelectric device, while cooling the remaining portion of the liquefied gas within the container by contact with a cooling surface of the thermoelectric device.

2. State of the Art

Supplying of pressurized gases of various types may be required for manufacturing processes, powering vehicles, as well as other uses. Typically, liquefied gases may be stored within containers or vessels and the gas within may be removed for use as needed. If the gas is not used, pressure may build within the container, and gas may be released so that pressures do not exceed a maximum pressure within the container. Containers or vessels for storing liquefied gas may also be insulated so that the liquefied gas therein may be stored in a liquid state for extended intervals of time. Therefore, the ultimate volumetric supply rate of pressurized gas from a liquefied gas container may be limited by the amount of heat energy that may be transferred through the container, by which heat energy the liquefied gas is vaporized.

One prior art solution to the limited gas supply from liquefied gas storage containers comprises heating the liquid within the container to the desired saturation pressure, thereby increasing the amount of gas that may be used. However, in situations where demand for the pressurized gas varies between relatively high volumes and relatively low volumes, such as in the case of a liquefied gas powered vehicle, heating the entire volume of the liquefied gas may have deleterious effects upon the storability of the liquefied gas when the demand for a large volume of gas diminishes.

A second prior art solution removes liquid from the tank and uses ambient heat to vaporize it, thus providing for relatively high volumes of gas to be used. However, merely adding heat to the liquefied gas does little to improve any capability for long term storage of the liquefied gas that remains within the container. Furthermore, such systems may be difficult to control or configure in some applications, such as within fuel tanks on heavy duty vehicles powered by a liquefied gas, such as natural gas.

U.S. Pat. No. 4,593,529 to Birochik discloses a thermoelectric heat pump that is used to control the temperature and pressure of confined substances, particularly carbon dioxide. Birochik discloses that a heat pump may be used to heat or cool the confined substance. In essence, this is similar to prior art solutions of adding or extracting heat from the bulk of the liquefied gas, but uses a heat pump. Therefore, the heat pump of Birochik may have detrimental effects upon the storability of the liquefied gas by adding external heat to the liquefied gas within the container in the manner of other prior art approaches.

In view of the foregoing, an apparatus and method for delivery of pressurized gas from a liquefied gas container which improves on conventional apparatus and methods and eliminates many of their respective disadvantages would be desirable.

BRIEF SUMMARY OF THE INVENTION

The present invention comprises an apparatus employing a thermoelectric device configured to deliver heat energy to a surface of the device in contact with a liquid such as, for example, a liquefied gas to vaporize at least a portion thereof and increase internal container pressure while cooling (or removing heat energy from) another surface of the device in contact with liquefied gas, and methods of pressurizing a liquefied gas container. The pressure increase within the container is based on the principle that a liquid within a closed vessel raised to a temperature greater than that of saturation results in an increase in pressure within the vessel. Thus, the net effect of the vaporization, if no gas is removed from the container, will be to increase the pressure within the container. If a volume of gas in a liquid or vapor state is removed, the pressure within the container may be reduced accordingly. Therefore, "pressurizing" a container, as that term is used herein, applies to increasing the pressure within a container or to producing gas for removal therefrom in a vapor state or liquid state.

Thermoelectric devices operate on the Peltier effect, which is the heating and cooling effect that occurs when electric current passes through two dissimilar conductors. Therefore, by applying a voltage to the free ends of two electrically connected, dissimilar materials a temperature difference may be generated. An exemplary thermoelectric cooler may comprise an array of paired p- and n-type semiconductor elements that act as the two dissimilar conductors, although the invention is not so limited. The array of elements may be conductively connected between two electrical- and thermal energy-conducting plates configured to be connected electrically in series and thermally in parallel. As electric current passes through one or more pairs of semiconductor elements, there is a decrease in temperature at the junction ("cold surface") resulting in the absorption of heat from the surrounding environment. The heat is transferred through the thermoelectric device by electron transport and released on the opposite ("hot") surface as the electrons move from a high to low energy state. The heat pumping capacity of a thermoelectric device is proportional to the current and the number of pairs or couples of n- and p-type elements. The present invention employs thermoelectric devices to pressurize liquefied gas containers.

In one embodiment, a thermoelectric device located within a liquefied gas container and configured as a tube may transfer heat energy from the liquefied gas within the container and surrounding the tube to the interior of the tube and, thus, to liquefied gas within the tube in order to vaporize that liquefied gas so that it may be used to pressurize the container. Such a configuration may provide an efficient and effective system for increasing the pressure within a liquefied gas container and also provide increased rates of pressurized gas removal therefrom, while substantially maintaining or improving the storability of the liquefied gas that remains within the container. In addition, the net heat added to the liquefied gas from the thermoelectric device may be limited to that attributable to any inefficiencies of the thermoelectric device.

Because heat energy may be transferred from the liquefied gas remaining in the container to the liquefied gas that is vaporized, the net effect of operating a thermoelectric device may be overall cooling of the liquefied gas remaining in the container. Factors affecting the temperature of the liquefied gas within the container may include the rate of removal of pressurized gas, the inefficiency of the thermoelectric device, the volume of liquefied gas within the container, and heat transfer from the environment surrounding the container.

In addition, it may be advantageous to optimize the surface area of contact between the liquefied gas and the cooling surface of a thermoelectric device. One consideration is that, when the volume of liquefied gas within a container is relatively small, it may be desirable to orient the thermoelectric device so that the surface area of contact between the cooling surface and the liquefied gas may be maximized. For instance, a thermoelectric device may be configured to float within the liquefied gas, so that for liquefied gas volumes that vary between a minimum and a maximum, the cooling surface may always be completely or at least substantially in contact with the liquefied gas within the container. Alternatively, a thermoelectric device may be hingedly or pivotally attached to the inside of the container or placed proximate the bottom thereof so that, when liquefied gas volumes become relatively small, the thermoelectric device may be adapted to maintain or even improve the surface area for contact between the cooling surface of the thermoelectric device and the liquefied gas.

As another consideration, it may be desirable to control the flow of liquefied gas that may be allowed to contact the heating surface as well as preventing liquefied gas that may be heated by the heating surface of the thermoelectric device from reentering the liquefied gas remaining in the container and consequently reducing the storability thereof. Therefore, selectively sized apertures, alone or in combination with positively actuated valves, check valves, or other flow control devices may be employed to meter introduction of liquefied gas in proximity to the heating surface as well as prevent heated liquefied gas from reentering the liquefied gas remaining within the tank. Also, a valve, such as a regulator valve, for controlling the pressure of gas generated by way of the heating surface may also be desirable. A thermoelectric device configured with valves may be employed so that the thermoelectric device may be substantially submerged within the liquefied gas within the container to enable a substantially constant surface area of contact between the liquefied gas within the container and the cooling surface of the thermoelectric device. A suitably configured thermoelectric device according to the present invention may also be operated as a vapor pump or a liquid pump, or fluid pump.

Moreover, it may be desirable to improve the heat transfer between the cooling and heating surfaces of the thermoelectric device and the liquefied gas in contact with either surface. More specifically, circulation of liquefied gas in contact with either the cooling or heating surface to increase convective heat transfer is contemplated by the present invention, as well as increasing the effective surface area of the cooling and heating surfaces by way of fins, surface treatments, or by other techniques known in the art.

In another embodiment, a thermoelectric device having planar or nonplanar heating and cooling surfaces may be employed as a portion of the wall of the container containing liquefied gas, wherein the "heating" surface provides heat energy to a portion of liquefied gas to vaporizing it and pressurize the liquefied gas container, while the cooling surface removes heat from the remaining volume of liquefied gas within the container. The present invention further contemplates that circumferential sections of a container may be defined by, or include, at least one thermoelectric device.

As a further embodiment, more than one thermoelectric device may be configured so that a heating surface of one thermoelectric device faces a heating surface of another thermoelectric device. Additional thermoelectric devices with heating surfaces and cooling surfaces may be nested, or configured so that a cool surface of one thermoelectric device faces a cooling surface of another thermoelectric device.

Features from any of the above mentioned embodiments may be used in combination with one another in accordance with the present invention. In addition, other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

In the drawings, which illustrate what is currently considered to be the best mode for carrying out the invention:

FIG. 6 is a schematic side sectional view of an embodiment of the present invention wherein a liquid chamber and a laterally adjacent ullage chamber have a thermoelectric device interposed there between.

DETAILED DESCRIPTION OF THE INVENTION

Figure 1A:
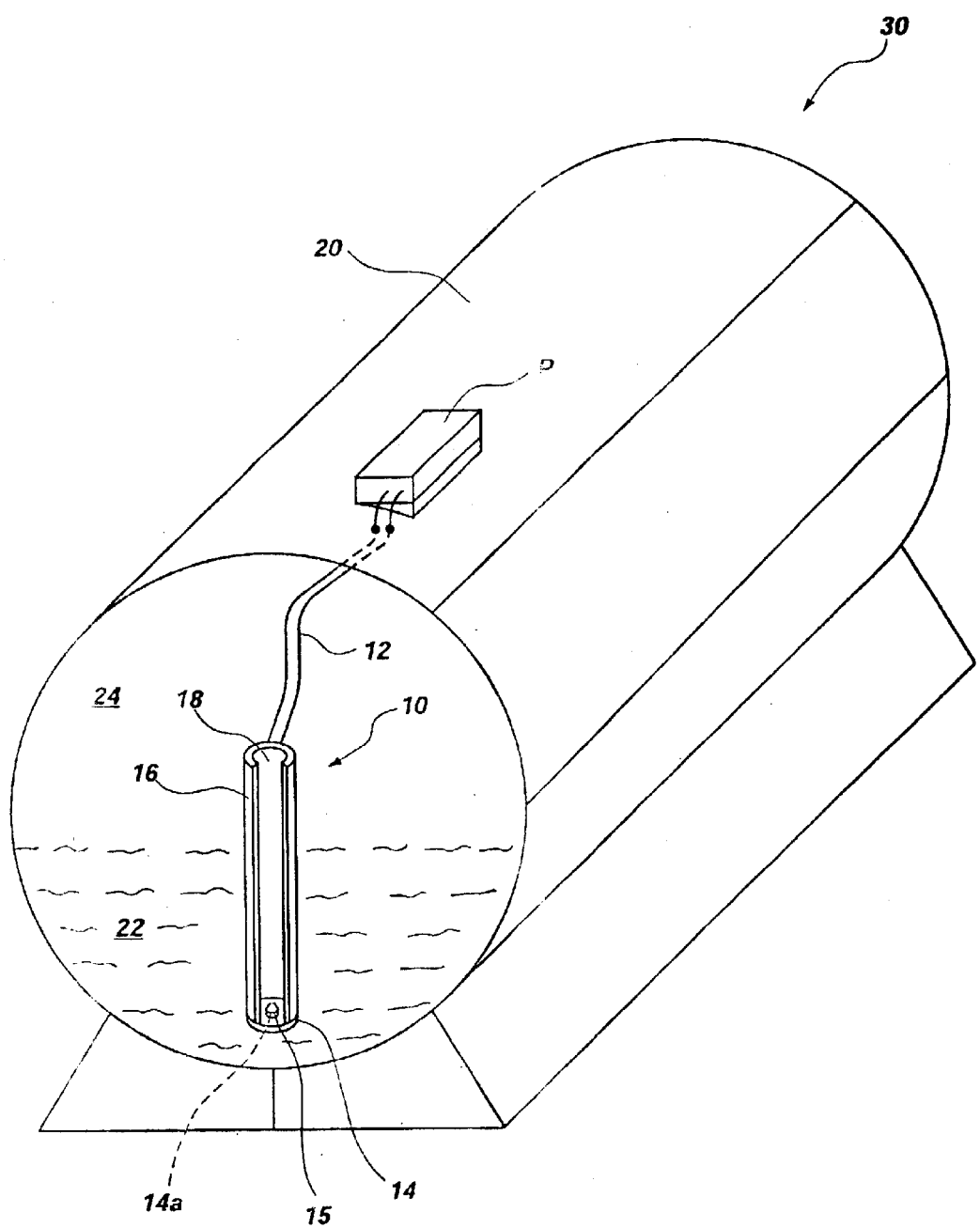
FIG. 1A is a schematic, perspective, partial cutaway view of a container system of the present invention.
Figure 1B:
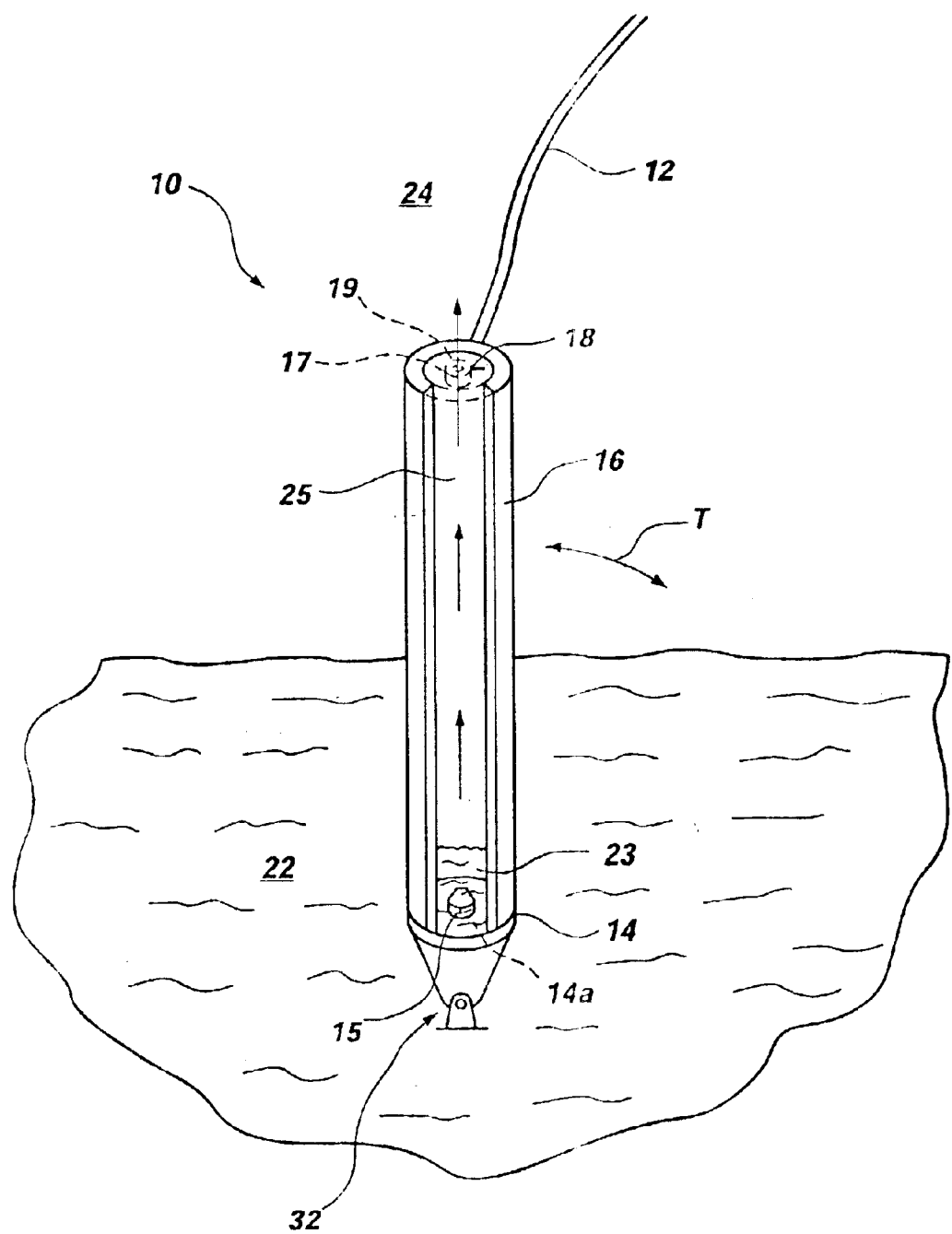
FIG. 1B is an enlarged, partial cutaway schematic view of the thermoelectric device shown in FIG. 1.

FIG. 1A shows a container system 30 including a thermoelectric device 10 of the present invention configured as a tube having a bore comprising an inner, heating surface 18 and having an outer, cooling surface 16, thermoelectric device 10 being disposed within liquefied gas container 20. As shown, thermoelectric device 10 may be rigidly secured as by, for example, brackets to the interior of liquefied gas container 20 in an upright position, with the lower end thereof disposed proximate, but above, the floor of container 20. Liquefied gas container 20 contains a liquefied gas volume 22, which may also be characterized as gas in a liquid state, in a lower portion thereof and a vapor state gas volume 24 in an upper, ullage portion thereof. By way of example and not limitation, the present invention may be suitable for use with liquefied propane (LP) gas and liquefied natural gas (LNG), the latter of which may be more appropriately described as liquefied cryogenic methane. Thermoelectric device 10 is configured to be installed within liquefied gas container 20 so that a portion of liquefied gas volume 22 may enter the thermoelectric device 10 by way of an aperture 14a through an end cap 14 at the bottom thereof, which aperture 14a may optionally have a valve 15 associated therewith. Insulated conductive elements 12 in the form of wires may be used to provide electricity to the thermoelectric device 10 from power source P external to container 20. FIG. 1B shows a thermoelectric device 10 disposed within liquefied gas volume 22 in a partial sectional schematic view. As noted previously, container 20 may be highly insulated, as is conventional, so the insulation has not been depicted for clarity.

A thermoelectric device of the present invention may be configured, sized, and located to produce an anticipated flow rate of gas from the container of liquefied gas, as well as to produce a desired pressure or range of pressures within the container. Of course, the thermoelectric device of the present invention may be fabricated and configured to operate under the ambient conditions within the container including the temperatures of the liquefied gas contained thereby.

During operation, as shown in FIG. 1B, liquefied gas 23 may enter thermoelectric device 10 by way of aperture 14a of end cap 14, which aperture 14a may be appropriately sized for the anticipated consumption rate of the liquid contained in container 20. Such sizing may, of course, vary depending on whether the gas phase or liquid phase is to be consumed and whether the liquefied gas volume should remain as a subcooled liquid and the vapor phase superheated. Optional valve 15 may comprise an opening sized and configured to allow liquefied gas volume 22 to enter thermoelectric device 10 in a controlled or metered manner and be configured as a mechanically, electrically or magnetically actuated valve, which may comprise an on/off valve or an adjustable, throttling-type valve as known in the art. It may be desirable to configure valve 15 as a check valve biased to close at a desired pressure differential between the interior of the tube and the liquefied gas therebelow so that liquefied gas 23 that enters thermoelectric device 10 may not subsequently flow by convection out of valve 15 after having been heated and vaporized into liquefied gas volume 22, thereby reducing the storability of liquefied gas volume 22. The pressure differential is due to hydrostatic head effects. A check valve with the appropriate cracking pressure characteristics is but one control option based on the size and orientation of the liquefied gas container 20 and its associated ullage space. The drivers for the design depicted in FIGS. 1A and 1B are application and geometric configuration.

Thermoelectric device 10 containing liquefied gas 23 within its interior may be energized via a current passed through conductive elements 12 from power source P (see FIG. 1A) exterior to container 20. Heat from the liquefied gas volume 22 in contact with cooling surface 16 may be transferred by thermoelectric device 10 to heating surface 18, to vaporize and superheat the liquefied gas 23 within the bore of the tube defined thermoelectric device 10. Thus, gas in a vapor state 25 may exit thermoelectric device 10 at its upper longitudinal end into gas volume 24 above the level of liquefied gas volume 22 in container 20 and the container 20 may be pressurized thereby. In addition, since heat energy is transferred by thermoelectric device 10 from liquefied gas volume 22 remaining within container 20, any heat that may be added to the liquefied gas volume 22 from the thermoelectric device may be due only to any nominal inefficiency of thermoelectric device 10. In operation, the thermoelectric device 10 of the present invention transfers heat from a liquefied gas volume 22 within a container 20 to a small volume of liquefied gas 23 within the thermoelectric device 10 in order to vaporize the liquefied gas 23 within the thermoelectric device 10. The resulting vapor state gas 25 exiting the thermoelectric device 10 serves to increase the pressure within a container 20 as well as to provide an increased volume of gas in a vapor state for withdrawal therefrom and use, and may also substantially maintain or improve the storability of the remaining liquefied gas volume 22 within container 20 by cooling liquefied gas volume 22.

Thermoelectric device 10 may be mounted or otherwise positioned in relation to a container 20 so that a portion of liquefied gas volume 22 may enter thermoelectric device 10. In addition, it may be advantageous to position thermoelectric device 10 to increase the contact area between cooling surface 16 and liquefied gas volume 22. Therefore, end cap 14 may be hingedly or pivotally attached to a container 20 as shown in FIG. 1B at 32 so that, as the level of liquefied gas volume 22 changes, the thermoelectric device 10 may be allowed to tilt as indicated by arrows T and be disposed at an angle within liquefied gas volume 22, thereby maintaining a substantially constant surface area for contact between cooling surface 16 and liquefied gas volume 22.

As a further contemplation of the present invention, referring to FIGS. 1A and 1B, the upper longitudinal end of thermoelectric device 10 may include an end cap 17 including check valve 19 so that the thermoelectric device 10 may be positively pressurized with respect to the pressure within the container 20 and vapor state gas 25 may escape from thermoelectric device 10 without fear of entry of an excess volume of liquefied gas from liquefied gas volume 22. In a configuration where valve 15 comprises a check valve allowing liquefied gas to enter thermoelectric device 10 and the upper longitudinal end of thermoelectric device 10 includes an end cap 17 bearing check valve 19 for allowing gas to escape and preventing liquefied gas from entering, thermoelectric device 10 may be positioned at the bottom of the container 20, since thermoelectric device 10 may thereby be isolated from the liquefied gas volume 22 in the container 20. Thus, appropriate biasing of check valves 15 and 19 may be used to open the interior of thermoelectric device 10 to liquid when pressure is reduced therein, and to close it when heating and vaporization is occurring until the gas phase bleeds off excess pressure into the tank (or associated ullage space and pressure is equalized again. As a result, thermoelectric device 10 may be positioned substantially horizontally proximate the bottom of container 20. Thus, thermoelectric device 10 may be substantially submerged within liquefied gas volume 22 of container 20, thereby increasing the cooling effect of cooling surface 16 on liquefied gas volume 22. Further, biasing of cracking pressure may be used to control the level of liquefied gas 23 and the state of superheat for vaporized fluids. Thermoelectric device 10 may thus also be used as a vapor pump for some applications to create larger pressure differentials in storage spaces which do not communicate directly with an ullage space.

Figure 1C:
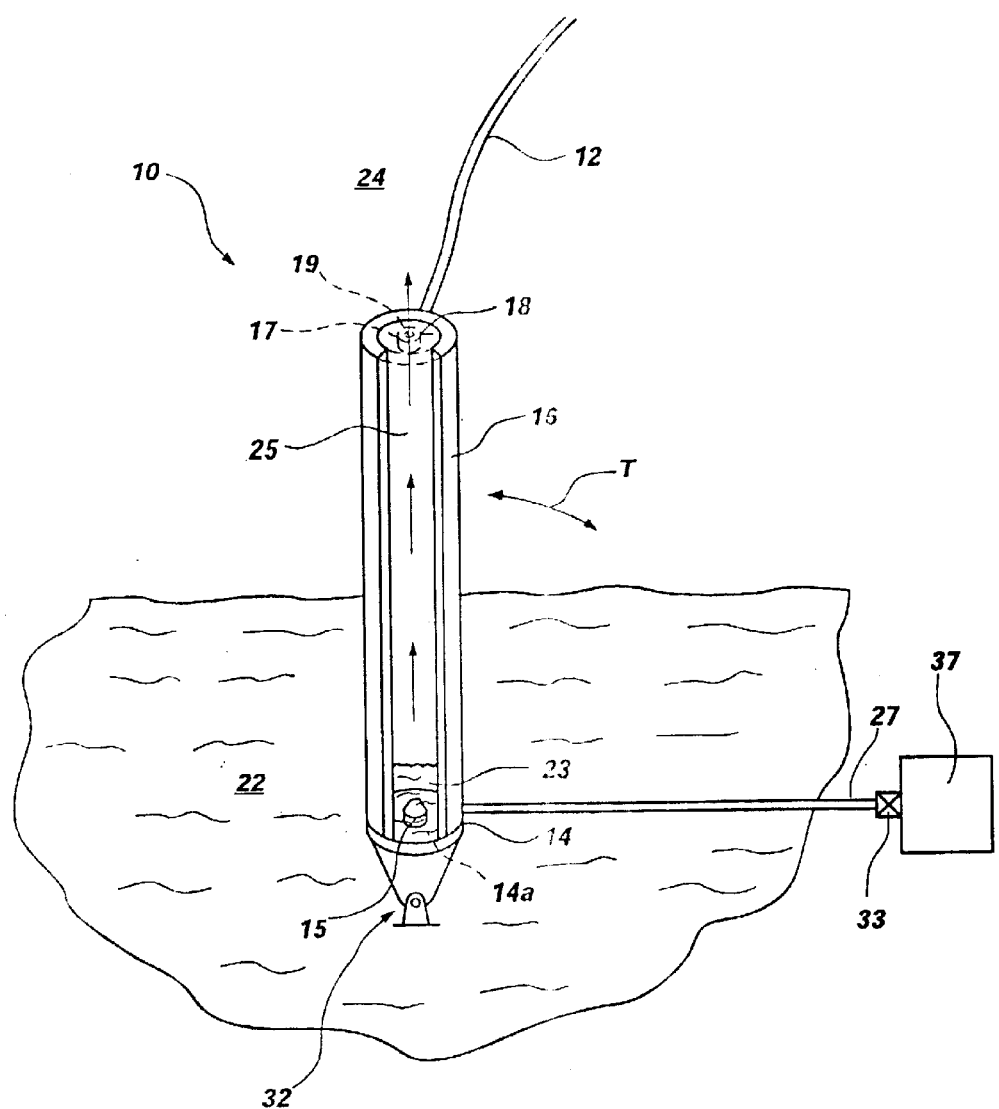
FIG. 1C is an enlarged, partial cutaway schematic view of the thermoelectric device of FIG. 1 configured as a fluid pump.

Although thermoelectric device 10 may be, as noted above, used as a vapor pump for some applications, it may also, or alternatively, be used as a liquid pump, or fluid pump, for some applications. For instance, FIG. 1C shows the thermoelectric device 10 of FIG. 1B, including a fluid transmitting element 27 (e.g., a tube or pipe) for allowing pressurized liquefied gas 23 to exit the thermoelectric device 10 under pressure of vapor state gas thereabove within thermoelectric device 10. Fluid transmitting element 27 may be flexible or otherwise configured to allow thermoelectric device 10 to tilt as indicated by arrows T, about 32 and may be connected to thermoelectric device 10 near valve 15 so that liquefied gas 23 may be transmitted thereby, and so that vapor state gas 25 may not preferably be transmitted thereby. Additional valves (not shown) that control the flow of pressurized fluid through fluid transmitting element 27 may be employed as known in the art. Pressurized liquefied gas exiting the thermoelectric device 10 may also exit the tank (not shown) if desired, or alternatively may be used to pressurize a larger sealed volume of liquefied gas.

Further, it may be desired to use the thermoelectric device 10 of the present invention to charge, via fluid transmitting element 27, an accumulator or other fluid pressure storage device 37 so that pressurized liquefied gas may be delivered. Because liquefied gas volume 22 will enter the thermoelectric device 10 only when the pressure outside of the thermoelectric device 10 exceeds the pressure within the thermoelectric device 10, a cycle may be utilized so that a thermoelectric device 10 may be utilized as a fluid pump. For example, liquefied gas from liquefied gas volume 22 may enter thermoelectric device 10 via valve 15 (while valve 19 is open), and then both valves 15 and 19 may be closed. Thermoelectric device 10 may be energized, and the liquefied gas 23 within the thermoelectric device 10 may exit via fluid transmitting element 27 to a pressure storage device 37 and through check valve 33 so that pressure within pressure storage device 37 will not be released therefrom upon opening either valve 15 or 19 of the thermoelectric device 10. Upon exhausting liquefied gas 23 within thermoelectric device 10, excess pressure within thermoelectric device 10 may be released by opening valve 19, and then another volume of liquefied gas 23 may be introduced by also opening valve 15, so that the hydrostatic head of liquefied gas 22 will cause the thermoelectric device 10 to fill with liquefied gas 23 and the sequence may be repeated as desired. Of course, the pressurized gas that may exit valve 19 may also or alternatively be used to charge a pressure storage device (e.g., a gas-charged accumulator) or other pressurized liquid delivery system for providing pressurized liquefied gas. Alternatively, a pump device may be employed to introduce liquefied gas into the thermoelectric device 10. Further, it may be advantageous to employ a pressure intensifier in some instances in combination with the thermoelectric device 10 of the present invention.

Although FIGS. 2–6 are described generally with reference to a thermoelectric device or devices for providing pressurized gases, it may be seen from FIG. 1C that the thermoelectric device embodiments of the present invention as described herein may be modified to supply pressurized liquid in addition, or as an alternative to, pressurized gases. Appropriate valves and fluid transmitting devices may be sized, configured, and located so that pressurized fluid may be delivered by way of a thermoelectric device. Accordingly, fluid and/or pressure storage devices may also be employed in combination with the thermoelectric devices of the present invention.

Figure 2:
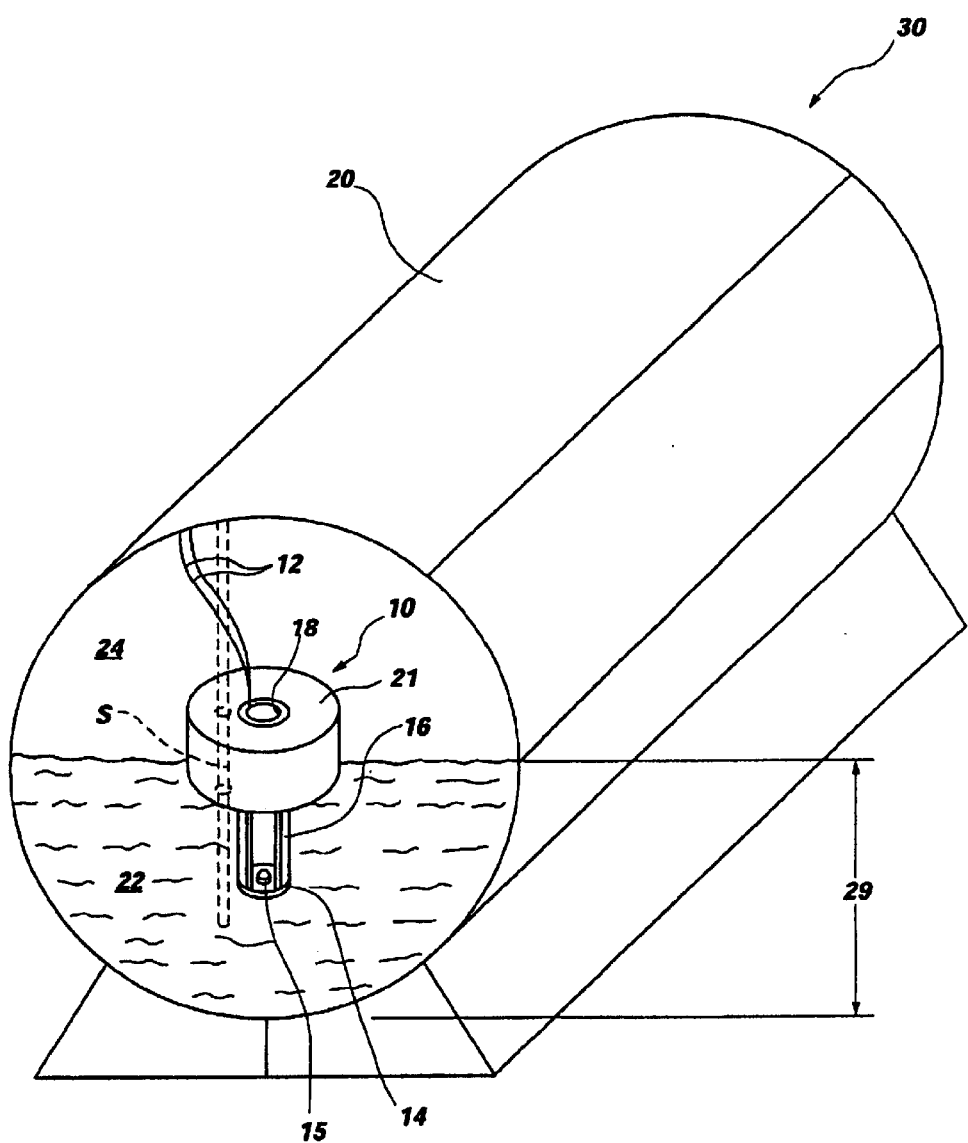
FIG. 2 is a schematic, perspective view of a thermoelectric device including a float of the present invention.
Figure 2A:
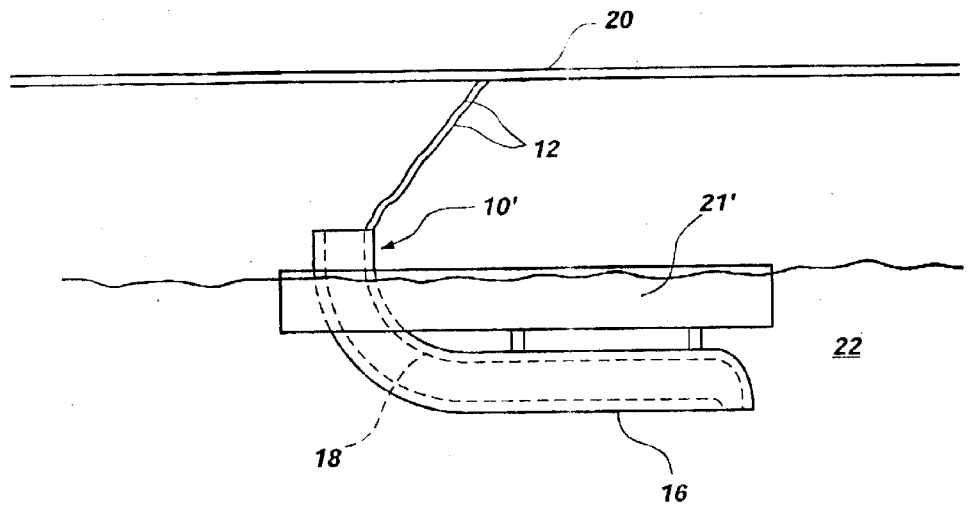
FIG. 2A is a side schematic view of another configuration of thermoelectric device including a float.

FIG. 2 shows a schematic view of another embodiment of container system 30 and thermoelectric device 10 of the present invention wherein thermoelectric device 10 includes a float 21. Float 21 buoyantly positions thermoelectric device 10 within liquefied gas volume 22 so that substantially all of cooling surface 16 may be in contact with liquefied gas volume 22 while liquefied gas depth 29 is sufficient to cause thermoelectric device 10 to float. Such a configuration may be desirable when the liquefied gas depth typically varies between certain known values. As schematically depicted in FIG. 2A, the thermoelectric device 10' may be configured in a reclining "J" or "L" shape and suspended from a float 21' so that a substantial length thereof may be maintained in contact with liquefied gas volume 22 even when the level thereof is extremely low in container 20.

Operation of the thermoelectric device 10 shown in FIG. 2 is as described with respect to FIGS. 1A and 1B in that liquefied gas may enter thermoelectric device 10 by way of valve or orifice 15 configured within end cap 14. Thermoelectric device 10 may be energized via conductive elements 12 so that heat from the liquefied gas volume 22 in contact with cooling surface 16 may be transferred to heating surface 18, thus vaporizing the liquefied gas within the thermoelectric device 10. Thus, gas in a vapor state may exit thermoelectric device 10 at its upper longitudinal end into gas volume 24 and the container 20 may be pressurized thereby.

A floating thermoelectric device 10 as shown in FIG. 2 may also be configured to slide up and down along a shaft S which extends through an aperture in float 21 as shown in broken lines and is secured within container 20 so that the thermoelectric device 10 may be oriented substantially upright or, in other words, the thermoelectric device 10 tube may be maintained in place and in an orientation substantially perpendicular to the surface of the liquefied gas volume 22, as shown in FIG. 2. Such an arrangement may be particularly suitable for vehicular applications. In addition, conductive elements 12 may be configured with sufficient slack to move as the position of thermoelectric device 10 changes in accordance with the liquefied gas depth 29.

Figure 3A:
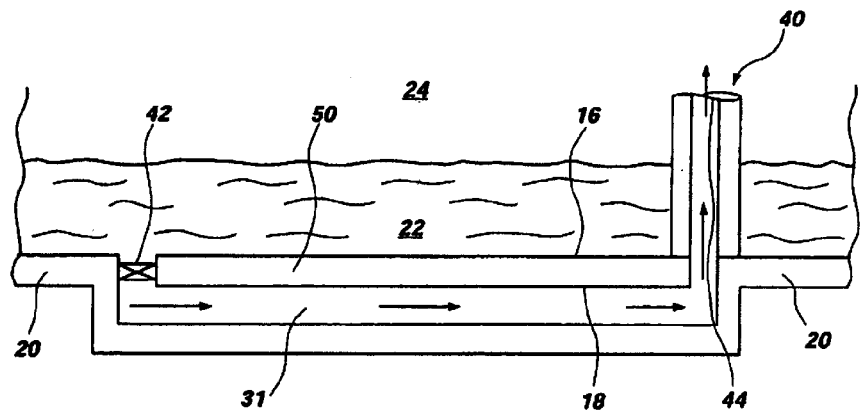
FIG. 3A is a partial schematic view of a thermoelectric device of the present invention configured as a portion of a container structure.

In a further embodiment, shown in FIG. 3A, a thermoelectric device 50 may be configured as a portion of the container 20. More specifically, thermoelectric device 50 may be configured with a cooling surface 16 that is in contact with liquefied gas volume 22 and a heating surface 18 that forms, in part, chamber 31. A portion of liquefied gas volume 22 may enter chamber 31 via valve 42 and be vaporized therein via heating surface 18, the gas exiting tube 40 through aperture 44 at its uppermost longitudinal end, to pressurize the container 20. Tube 40 may be elongated so as to extend to a location proximate the top of container 20 to position aperture 44 above the highest possible level of liquefied gas volume 22. Alternatively, aperture 44 may be configured with a check valve, so that pressure within chamber 31 must exceed the pressure within container 20 for gas to pass therethrough.

As a further embodiment, tube 40 may be configured as a thermoelectric device 10 in combination with thermoelectric device 50, or in lieu of thermoelectric device 50, so that the interior of the tube 40 comprises a heating surface, and the exterior of the tube 40 comprises a cooling surface in contact with liquefied gas volume 22. Of course, tube 40 may be configured with an entry valve and an exit valve as previously discussed in relation to the thermoelectric device shown in FIG. 1.

Figure 3B:
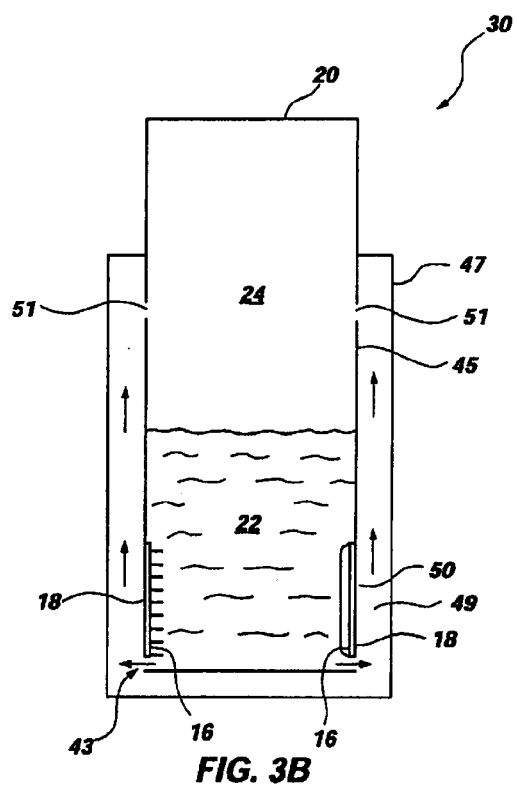
FIG. 3B is a side cross-sectional view of a container system of the present invention including a circumferential thermoelectric device.

FIG. 3B shows a side cross-sectional schematic view of an embodiment of container system 30 wherein thermoelectric device 50 is configured as a circumferential section of container 20. More specifically, inner wall 45 may include one or more circumferentially placed thermoelectric devices 50. The cooling surface 16 of thermoelectric device 50 may be in contact with liquefied gas volume 22. During operation, a portion of liquefied gas from liquefied gas volume 22 flows through at least one opening 43 in inner wall 45 and may contact heating surface 18 in peripheral chamber 49 defined between inner wall 45 and outer wall 47, causing the portion of liquefied gas volume 22 proximate to heating surface 18 to be vaporized, becoming part of gas volume 24 and thereby pressurizing container 20. Ports 51 facilitate the escape of vaporized gas from peripheral chamber 49 to pressurize the container 20.

Figure 4:
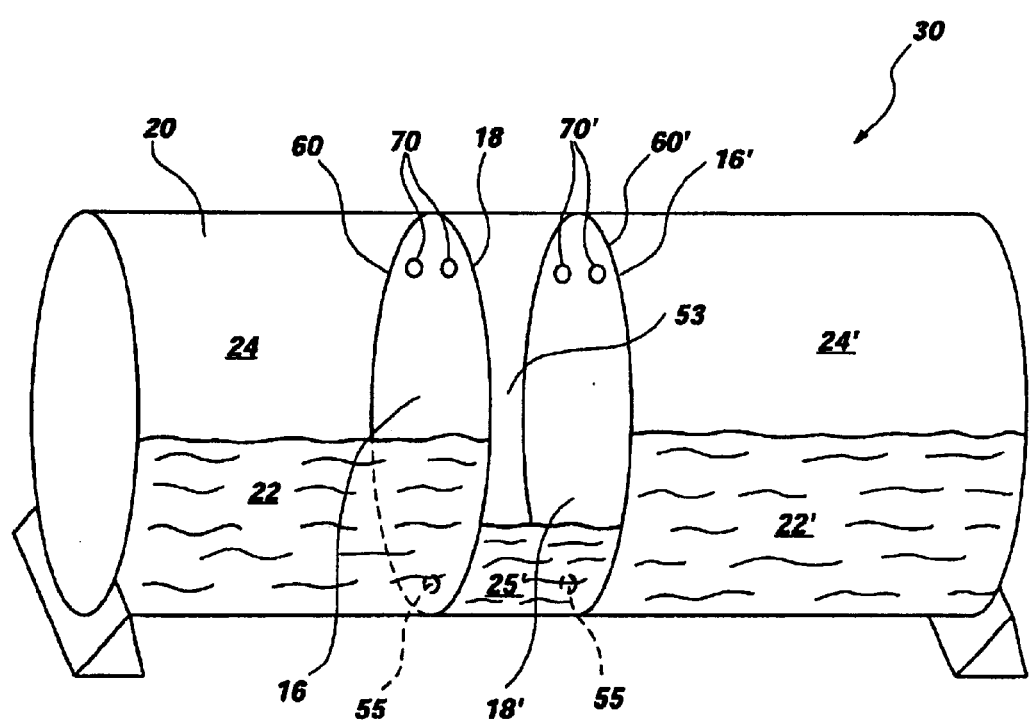
FIG. 4 is a schematic view of a container system of the present invention wherein a chamber is formed between thermoelectric devices for heating a liquefied gas.

FIG. 4 shows yet another alternative container system 30 of the present invention, wherein thermoelectric devices 60 and 60' may be configured to be substantially planar, and positioned to form an ullage chamber 53 within container 20. Heating surfaces 18 and 18' are oriented to face inwardly toward ullage chamber 53, in order to vaporize liquefied gas volume 25' and thereby pressurize container 20 by communication of vaporized liquefied gas through apertures 70 and 70' between thermoelectric devices 60 and 60' to gas volumes 24 and 24', respectively. Valves or other flow control devices as previously discussed may optionally be used to allow liquefied gas from liquefied gas volume 22 or 22' to flow into ullage chamber 53 through apertures 55, the liquefied gas therein shown as liquefied gas volume 25'. If a valve is used to control the flow of liquefied gas from liquefied gas volume 22 or 22' into ullage chamber 53, apertures 70 and 70' may be necessary; otherwise, ullage chamber 53 may be sealed from the remaining portion of container 20 and increased pressure may only develop within ullage chamber 53. On the other hand, if the valve or other flow control device allows for pressure to be communicated from the ullage chamber 53 to the other sections of the container 20, apertures 70 and 70' may not be necessary to develop pressure within the container 20.

Because liquefied gas volume 25' may only contact a portion of thermoelectric devices 60 and 60', it may be desirable to configure the heating surfaces 18 and 18' to substantially correspond to the anticipated area of contact between liquefied gas volume 25 and heating surfaces 18 and 18'. For example, the lower area, a portion of which is in contact with liquefied gas volume 25', of thermoelectric device 60 and 60' may be configured to thermoelectrically operate, while the upper portion of the thermoelectric devices 60 and 60' may not be configured to thermoelectric operate, since the upper surfaces may not be in contact with liquefied gas volume 25'. Alternatively, a liquefied gas level sensor may be incorporated and used to selectively energize a portion of the thermoelectric device that is in contact with liquefied gas volume 22 or 22'. It may be advantageous to selectively energize only the portion of the thermoelectric device determined to be in contact with liquefied gas volume 22 or 22' because heat generated by way of thermoelectric device inefficiency may be reduced.

In addition, it may be advantageous to selectively determine the liquefied gas volume 22 or 22' from which liquefied gas volume 25' is comprised as well as the relative heat transfer by way of each thermoelectric device 60 and 60' in order to achieve desired results. For instance, it may be advantageous to comprise liquefied gas volume 25' from whichever of liquefied gas volume 22 or 22' has a higher temperature, because liquefied gas volume 25' from the higher temperature source will require less energy to vaporize. In addition, it may be advantageous to selectively energize thermoelectric device 18 or 18' according to the temperature of liquefied gas volume 22 or 22', respectively, since transferring heat from a warmer source may be achieved more easily.

For instance, if liquefied gas volume 22 is warmer than liquefied gas volume 22', it may be advantageous to remove liquefied gas from liquefied gas volume 22 so that it may more easily be vaporized by thermoelectric device. In addition, it may be advantageous to energize a thermoelectric device 60 having a cooling surface 16 that is in contact with liquefied gas volume 22 because since it is warmer and heat energy may be more easily transferred therefrom. Of course, temperature and volume sensors may be configured and installed within respective liquefied gas volumes 22 and 22' for input into an algorithm that implements a particular control paradigm. For instance, the control paradigm may be to equalize the temperature of each liquefied gas volume 22 and 22'. Therefore, the amount of liquefied gas that is removed from each liquefied gas volume 22 and 22' as well as the energy transferred by 18 and/or 18' may be determined, at least in part, by the temperatures and volumes of liquefied gas volume 22 and 22', as well as anticipated gas removal from the container 20, and other factors. Alternatively, the control paradigm may be intended to cool the warmest volume of liquefied gas to a lowermost temperature based upon efficiency or capability of the thermoelectric device. The temperature and volume of the liquefied gas to be vaporized, as well as the volume and temperature of the liquefied gas that the heat energy will be transferred therefrom may be measured and calculated or estimated in determining the amount of liquefied gas that may be allowed to contact the heating surface of a thermoelectric device, as well in determining the thermoelectric device or devices to energize and/or the amount of time or current to employ in energizing the thermoelectric device or devices.

Of course, FIG. 4 is merely illustrative and a container 30 may be configured with a plurality of ullage chambers 53 formed by way of thermoelectric devices 60 and 60'. Moreover, an ullage chamber may be formed as a horizontally extending chamber instead of the vertically extending chamber shown in FIG. 4. Further, the geometry of ullage chamber 53 may be configured to optimize vaporization of liquefied gas volume 25'. For instance, a parabola or dish shaped thermoelectric device heating surface may provide more efficient heating of liquefied gas volume 25 by way of focusing radiant heat therefrom. Furthermore, finned surfaces or other surface configurations (see FIG. 3B) may be used to enhance the heat transfer to or from a surface of a thermoelectric device. Regarding heat transfer, it may also be advantageous to provide a fluid movement device, e.g., a pump, to circulate liquefied gas against a cooling surfaces or heating surface to increase the convective heat transfer thereto or therefrom, respectively, although such a mechanism may add undesirable complexity to the present invention.

Figure 5:
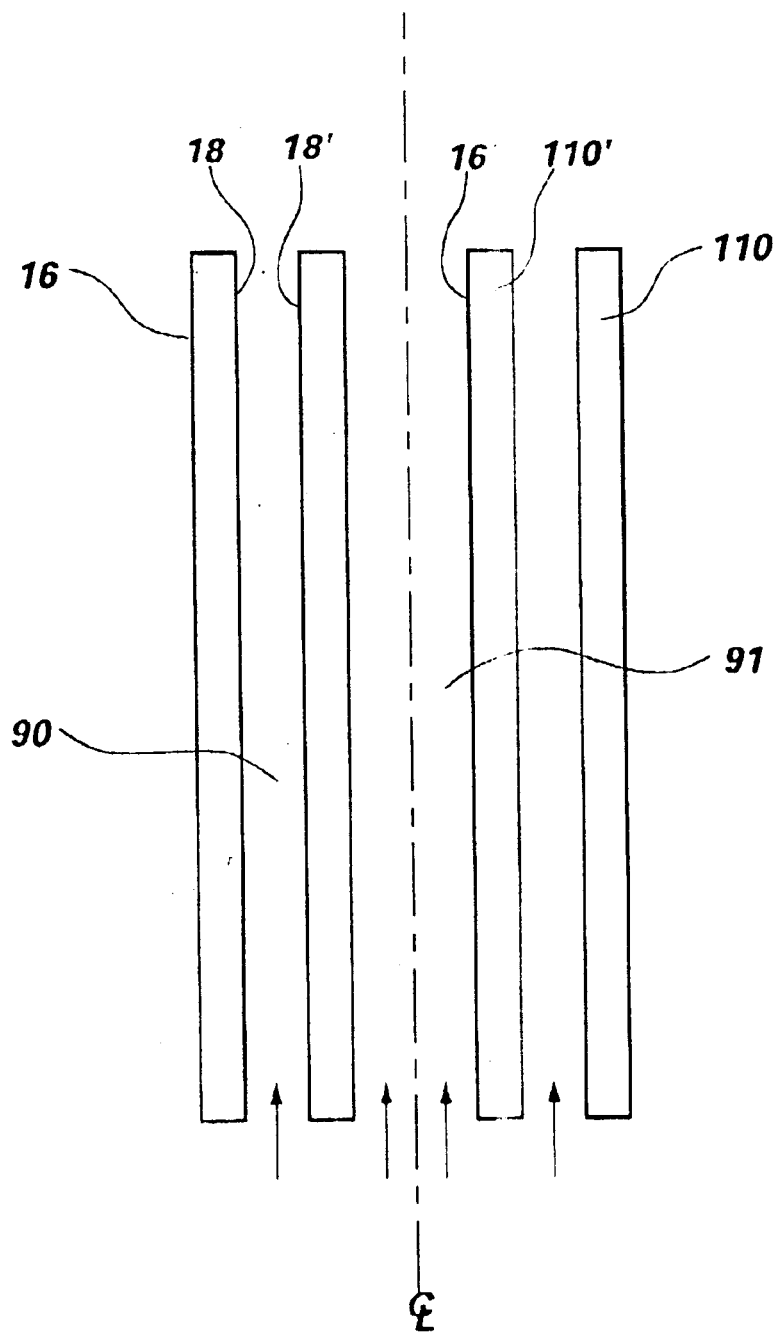
FIG. 5 is a partial side cross-sectional view of an embodiment of the present invention wherein two thermoelectric devices are arranged so that the heating surface of one thermoelectric device faces the heating surface of another thermoelectric device.

The present invention also contemplates multiple thermoelectric devices that are nested so as to vaporize liquefied gas within a container. As shown in the partial cross-sectional view of FIG. 5, tubular thermoelectric devices 110 and 110' may be configured so that heating surfaces 18 and 18' face one another. Further, additional surfaces of additional thermoelectric devices may be employed in a similar pattern, with a heating surface of one thermoelectric device facing a heating surface of another thermoelectric device and respective cooling surfaces (if applicable) of different thermoelectric devices facing each other as well. Of course, plates may be employed in the same general way, with heating (and cooling, if applicable) surfaces of respective thermoelectric devices facing one another. In such a configuration as shown in FIG. 5, it may be advantageous to force liquefied gas through a cooling bore 91 formed by cooling surface 16' of thermoelectric device 110' to facilitate heat transfer thereto and subsequently into the liquefied gas passing through or within heating annulus 90 formed between heating surface 18 of thermoelectric device 110 and heating surface 18' of thermoelectric device 110'. Similarly, liquefied gas may be circulated along cooling surface 16 of thermoelectric device 110 to facilitate heat transfer thereto and into the liquefied gas passing through or within heating annulus 90 formed between heating surface 18 of thermoelectric device 110 and heating surface 18' of thermoelectric device 110'.

Figure 6:
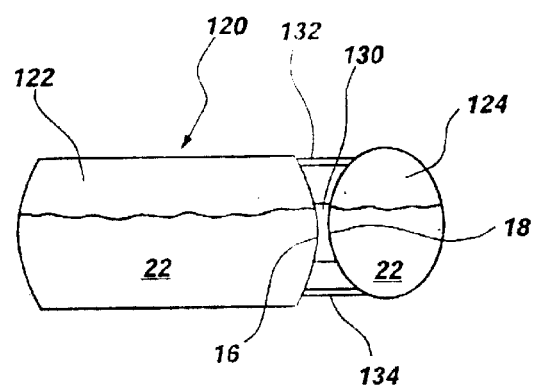

It is also contemplated that, as shown in FIG. 6, the container may be configured as a two-chamber container 120 comprising a liquid chamber 122 and an ullage chamber 124, with a thermoelectric device 130 disposed as an interface therebetween and fluid conduits 132 and 134 communicating therebetween, the conduits 132 and 134 being used to balance liquid levels and pressures between chambers 122 and 124. In this embodiment, the cooling surface 16 is in contact with a portion of the liquefied gas volume 22 in liquid chamber 122 and heating surface 18 is in contact with another portion of the liquefied gas volume 22 in ullage chamber 124. Such a configuration provides some insulation benefits and may be particularly desirable when there is large scale liquefied gas storage involved or a need for a fluid at different phases or states in different storage tanks.

By way of example as to the efficiency and low power draw required by the present invention, it is contemplated that a 20 gallon vehicle LNG fuel tank configured with a 10 watt thermoelectric device according to the present invention and having a 10% ullage volume may be pressurized from 30 psi to 75 psi in two minutes, the only heat being added to the fuel tank being from inefficiency of the thermoelectric device.

As may be seen from the foregoing description, many variations and configurations of thermoelectric devices and liquefied gas container systems are contemplated as within the scope of the invention. Therefore, although the foregoing description contains many specifics, these may not be construed as limiting the scope of the present invention, but merely as providing illustrations of some exemplary embodiments. Similarly, other embodiments of the invention may be devised which do not depart from the spirit or scope of the present invention. Features from different embodiments may be employed in combination with one another. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. An apparatus for pressurizing a liquefied gas, comprising:
   a container configured for receiving a gas in a liquid state therein and maintaining an elevated level of pressure therein relative to an exterior environment; and
   a thermoelectric device having a cooling surface and a heating surface and configured to transfer heat energy therebetween, the cooling surface located and configured for contact with a first portion of the liquid state of the gas received in the container and the heating surface located and configured for contact with a second, different portion of the liquid state of the gas received in the container to transfer heat energy from the first portion of the liquid state to the second, different portion thereof and effect transformation of at least some of the second portion to a vapor state.

2. The apparatus of claim 1, wherein the thermoelectric device is of a tubular configuration having a bore and includes an inner surface defining at least a portion of the bore and an outer surface.

3. The apparatus of claim 2, wherein one of the inner surface and the outer surface comprises the cooling surface and the other of the inner surface and the outer surface comprises the heating surface.

4. The apparatus of claim 2, further comprising a structure at one end of the tubular configuration for controlling entry of the liquid state of the gas thereinto.

5. The apparatus of claim 4, further comprising another structure proximate an opposing end of the tubular configuration for controlling exit of vapor state gas therefrom.

6. The apparatus of claim 4, further comprising another structure positioned and configured for controlling exit of the liquid state of the gas from the tubular configuration.

7. The apparatus of claim 2, wherein at least one of the heating surface and the cooling surface of the thermoelectric device includes a plurality of fins for effecting heat transfer therewith.

8. The apparatus of claim 1, further comprising at least another thermoelectric device having a cooling surface and a heating surface and configured to transfer heat energy therebetween, the cooling surface located and configured for contact with a first portion of the liquid state of the gas received in the container and the heating surface located and configured for contact with a second, different portion of the liquid state of the gas received in the container to transfer heat energy from the first portion of the liquid state to the second, different portion thereof and effect transformation of the second different portion to a vapor state.

9. The apparatus of claim 2, wherein the tubular configuration is pivotally attached to a bottom interior of the container.

10. The apparatus of claim 2, wherein the thermoelectric device further includes a float for at least partially buoyantly supporting the thermoelectric device via the liquid state of the gas.

11. The apparatus of claim 10, further including an upright shaft secured to the container, and wherein the thermoelectric device is slidably secured to the shaft.

12. The apparatus of claim 1, wherein the thermoelectric device forms at least a portion of the container.

13. The apparatus of claim 12, wherein the heating surface of the thermoelectric device defines a passage proximate a bottom of the container.

14. The apparatus of claim 13, wherein the thermoelectric device further includes an upwardly extending tubular passage in communication with the passage proximate the bottom of the container.

15. The apparatus of claim 1, wherein the thermoelectric device extends along at least a portion of a circumference of the container.

16. The apparatus of claim 15, wherein the thermoelectric device comprises a portion of a wall of the container, the cooling surface faces outwardly on one side of the wall, the heating surface faces outwardly on an opposing side of the wall and wherein the wall includes an aperture therethrough positioned to provide communication of the liquid state between the sides of the wall.

17. The apparatus of claim 16, wherein the heating surface comprises a portion of a passage extending along an exterior of the container.

18. The apparatus of claim 16, wherein the heating surface faces an ullage chamber within the container.

19. The apparatus of claim 1, wherein the thermoelectric device comprises at least a portion of an interface between a liquid chamber of the container and an ullage chamber of the container.

20. The apparatus of claim 19, wherein the liquid chamber and the ullage chamber are laterally adjacent, and further including at least one conduit extending between lower portions of the liquid chamber and the ullage chamber and at least another conduit extending between upper portions of the liquid chamber and the ullage chamber.

21. A method for pressurizing a liquefied gas container, comprising:
providing a container including a gas therein, at least some of the gas being in a liquid state; contacting a first portion of the gas in the liquid state and contacting a second portion of the gas in the liquid state with at least one thermoelectric device; and
transferring heat energy from the first portion of the gas in the liquid state to the second portion of the gas in the liquid state using the at least one thermoelectric device to vaporize at least some of the second portion of the gas in the liquid state.

22. The method of claim 21, further including configuring the at least one thermoelectric device as a tube and wherein contacting the first portion of the gas in the liquid state is effected on an exterior of the tube and contacting the second portion of the gas in the liquid state is effected within an interior of the tube.

23. The method of claim 21, further comprising controlling a volume of the second portion of gas in the liquid state in contact with the thermoelectric device.

24. The method of claim 21, further comprising locating the first portion of the gas in the liquid state in a first chamber of the container, and locating the second portion of the gas in the liquid state in a second chamber of the container.

25. The method of claim 21, further including buoyantly supporting the at least one thermoelectric device via the first portion of the gas in the liquid state.

26. The method of claim 25, further including permitting the at least one thermoelectric device to move vertically with a level of the first portion of the gas in the liquid state.

27. The method of claim 26, further including preventing substantial lateral movement of the at least one thermoelectric device within the container.

28. The method of claim 21, further comprising configuring the at least one thermoelectric device as a portion of at least one wall of the container.

29. The method of claim 21, further comprising regulating a power input to the at least one thermoelectric device to control a magnitude of pressure within the container.

30. The method of claim 29, further comprising sensing the magnitude of pressure within the container and regulating the power input responsive thereto.

31. The method of claim 21, further comprising removing at least a portion of the gas from the container.

32. The method of claim 31, wherein removing at least a portion of the gas comprises removing the at least a portion of the gas in a vapor state.

33. The method of claim 31, wherein removing at least a portion of the gas comprises removing the at least a portion of the gas in the liquid state.

34. The method of claim 21, further comprising controlling a volume of the at least some of the second portion of the gas in the liquid state vaporized by the at least one thermoelectric device.

35. The method of claim 34, further comprising increasing the pressure of the second portion of the gas in the liquid state by controlling a volume of the second portion of gas in the liquid state placed in contact with the thermoelectric device and controlling the volume of the at least some of the second portion of the gas in the liquid state vaporized by the at least one thermoelectric device.

36. The method of claim 35, further comprising removing at least a portion of the gas from the container.

37. The method of claim 36, wherein removing at least a portion of the gas comprises removing the at least a portion of the gas in a vapor state.

38. The method of claim 36, wherein removing at least a portion of the gas comprises removing the at least a portion of the gas in the liquid state.

39. The method of claim 38, wherein removing the at least a portion of the gas in the liquid state comprises transferring the removed at least a portion of the gas in the liquid state to a pressure storage device.

40. The method of claim 37, wherein removing the at least a portion of the gas in the vapor state comprises transferring the removed at least a portion of the gas in the vapor state to a pressure storage device.

41. An apparatus for pressurizing a liquid, comprising:
a container configured for receiving a liquid therein and maintaining an elevated level of pressure therein relative to an exterior environment; and
a thermoelectric device having a cooling surface and a heating surface and configured to transfer heat energy therebetween, the cooling surface located and configured for contact with a first portion of the liquid received in the container and the heating surface located and configured for contact with a second, different portion of the liquid received in the container to transfer heat energy from the first portion of the liquid to the second, different portion thereof and effect transformation of at least some of the second portion of the liquid to a gas.

42. The apparatus of claim 41, wherein the thermoelectric device comprises at least a portion of an interface between a liquid chamber of the container and an ullage chamber of the container.

43. The apparatus of claim 41, wherein the thermoelectric device extends along at least a portion of a circumference of the container.

44. The apparatus of claim 41, wherein the thermoelectric device forms at least a portion of the container.

45. The apparatus of claim 41, wherein the thermoelectric device is of a tubular configuration having a bore and includes an inner surface defining at least a portion of the bore and an outer surface.

46. A method for pressurizing a liquid, comprising:
providing a container including a liquid therein;
contacting a first portion of the liquid and contacting a second portion of the liquid with at least one thermoelectric device; and
transferring heat energy from the first portion of the liquid to the second portion of the liquid using the at least one thermoelectric device to vaporize at least some of the second portion of the liquid.

47. The method of claim 46, further including configuring the at least one thermoelectric device as a tube and wherein contacting the first portion of the liquid is effected on an exterior of the tube and contacting the second portion of the liquid is effect within an interior of the tube.

48. The method of claim 46, further comprising controlling a volume of the second portion of the liquid in contact with the thermoelectric device.

49. The method of claim 46, further comprising locating the first portion of the liquid in a first chamber of the container, and locating the second portion of the liquid in a second chamber of the container.

50. The method of claim 46, further including buoyantly supporting the at least one thermoelectric device via the first portion of the liquid.

51. The method of claim 46, further comprising configuring the at least one thermoelectric device as a portion of at least one wall of the container.

52. The method of claim 46, further comprising regulating a power input to the at least one thermoelectric device to control a magnitude of pressure within the container.

53. The method of claim 46, further comprising removing at least a portion of the liquid from the container.

54. The method of claim 46, further comprising controlling a volume of the at least some of the second portion of the liquid vaporized by the at least one thermoelectric device.

* * * * *